(12) United States Patent
Kaneko et al.

(10) Patent No.: US 7,616,884 B2
(45) Date of Patent: Nov. 10, 2009

(54) VIEWFINDER FOR SINGLE LENS REFLEX CAMERA

(75) Inventors: Hidefumi Kaneko, Tokyo (JP); Tetsuo Hosokawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 304 days.

(21) Appl. No.: 11/421,849

(22) Filed: Jun. 2, 2006

(65) Prior Publication Data

US 2006/0275029 A1 Dec. 7, 2006

(30) Foreign Application Priority Data

Jun. 3, 2005 (JP) .......................... P2005-163549

(51) Int. Cl.
G03B 17/20 (2006.01)
(52) U.S. Cl. .................. 396/296; 396/373; 396/383; 396/384; 359/836; 348/346
(58) Field of Classification Search .................. 396/296, 396/148, 292, 373, 383, 84, 378, 381; 359/836; 348/346

See application file for complete search history.

(56) References Cited

U.S. PATENT DOCUMENTS

| | | | |
|---|---|---|---|
| 5,041,854 A | 8/1991 | Kirigaya | |
| 5,488,446 A * | 1/1996 | Kirigaya et al. | ............. 396/296 |
| 5,839,007 A * | 11/1998 | Kawakami | ................... 396/296 |
| 5,969,869 A * | 10/1999 | Hirai et al. | ................... 359/599 |
| 6,314,246 B1 | 11/2001 | Ozaki et al. | |
| 6,430,375 B2 * | 8/2002 | Sensut | ......................... 396/382 |
| 6,493,364 B1 * | 12/2002 | Baumler et al. | ................ 372/15 |
| 6,584,284 B1 * | 6/2003 | Odaka | ......................... 396/121 |
| 6,879,781 B2 | 4/2005 | Kaneko et al. | |
| 2005/0002663 A1 * | 1/2005 | Haraguchi et al. | .......... 396/296 |

FOREIGN PATENT DOCUMENTS

| | | | |
|---|---|---|---|
| JP | 10221768 A | * | 8/1998 |
| JP | 2000-221568 | | 8/2000 |

OTHER PUBLICATIONS

A drawing labeled as "Figure 10" that appeared in the May 1990 issue of Shashin-Kogyo (Photographic Industry).
A drawing labeled as "Figure 16" that appeared in the Sep. 1991 issue of Shashin-Kogyo (Photographic Industry).
A drawing labeled as "Figure 5" that appeared in the Feb. 1999 issue of Shashin-Kogyo Photographic Industry).

* cited by examiner

*Primary Examiner*—W B Perkey
*Assistant Examiner*—Linda B Smith
(74) *Attorney, Agent, or Firm*—Greenblum & Bernstein P.L.C.

(57) ABSTRACT

In a viewfinder for a single lens reflex camera, in which a focused image of an object formed on a ground glass by a photographing lens is transmitted to an ocular optical system through a pentagonal prism or a pentagonal mirror and an information image displayed on an indication surface of an indication block is transmitted to the pentagonal prism or pentagonal mirror, through an indication prism, so that the object image and the information image are indicated in the finder view field of the ocular optical system, the indication surface of the indicator is inclined with respect to a direction perpendicular to an incident surface of the image-erecting optical member toward the incident surface, and an angle between the indication surface of the indicator and the incident surface of the image-erecting optical member is smaller than 90°.

14 Claims, 7 Drawing Sheets

10: Field Frame Plate
101: Field Frame
102: Information Frame

Fig.7

VIEWFINDER FOR SINGLE LENS REFLEX CAMERA

BACKGROUND OF THE INVENTION

1. Field of the Invention

The present invention relates to a viewfinder for a single lens reflex camera and, in particular, to a viewfinder having a display for indicating photographing information, or the like, within the field of view of the finder.

2. Description of the Prior Art

In a single lens reflex camera, an image of an object photographed by a photographing lens is exposed to a silver-halide film or is picked up by an image pickup device such as a CCD or a CMOS. The object image is reflected by a main mirror and is converged onto a focusing screen. The object image formed on the focusing screen is enlarged by the finder and can be viewed by a photographer. The object image formed on the focusing screen is inverted into an erect image by a pentagonal prism or pentagonal mirror (image-erecting optical member), so that the photographer can view an enlarged erect image by an eyepiece. In a conventional viewfinder, information, such as a diaphragm value or a shutter speed, is indicated together with the object image in the field of view. The information image which indicates the information is formed by an indicator made of an LCD (Liquid Crystal Display) or another optical element, the information image displayed in the indication device is optically connected to the pentagonal mirror/prism. The connected indication is displayed in the field of view of the finder.

Figure 7:
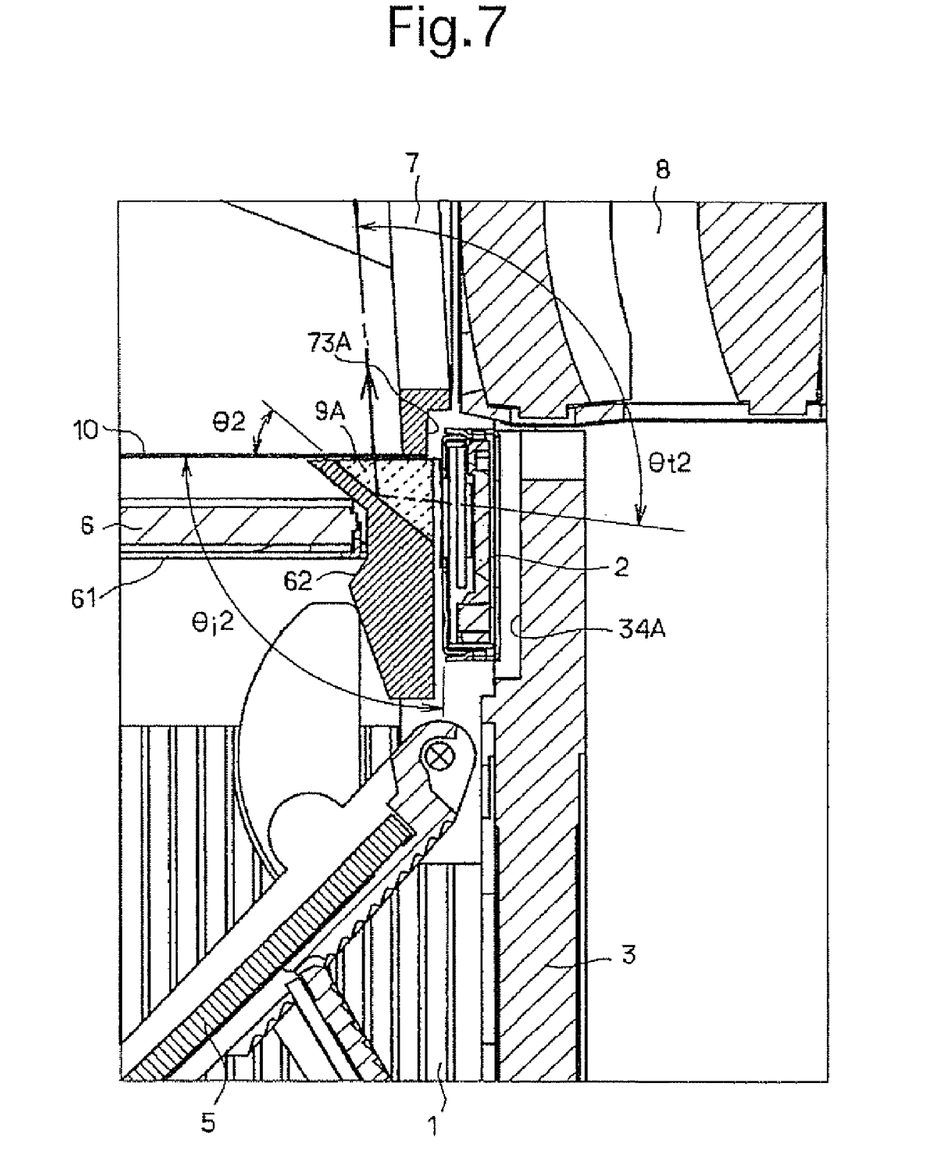
FIG. 7 is an enlarged sectional view of a part of an internal structure of a camera of the prior art.

In such a known viewfinder, in order to indicate the information image, an indicator 2 is provided in rear of a mirror box 1, as can be seen in FIG. 7, which shows the internal structure of a camera. An indication prism 9A which is substantially in the form of a triangular column is held by a holder 62 between the indicating surface of the indicator 2 and an incident surface of a pentagonal mirror 7, so that the information image displayed on the indicating surface is transmitted to the inside of the pentagonal mirror 7 through the indication prism 9A. Namely, the indication prism 9A has an incident surface defined by one of the side surfaces forming a triangular column that extends in the vertical direction and faces the incident surface of the indicator 2. One of the remaining surfaces defines an emitting surface which faces the incident surface of the pentagonal mirror 7, and the remaining surface located between the incident surface and the emitting surface defines an inclined reflecting surface. With this arrangement, the information image indicated in the indicator 2 is incident upon the incident surface into the indication prism 9A, is internally reflected by the reflecting surface and is emitted from the emitting surface toward the pentagonal mirror 7. The object image formed by the light bundle transmitted through the photographing lens (not shown) and reflected by the main mirror 5 onto the focusing screen 6 is also incident upon the pentagonal mirror 7. The information image and the object image are inverted into erect images by the pentagonal mirror 7, so that the erect images can be viewed through an ocular optical system 8 by a photographer. In the ocular optical system 8, as the information image and the object image are converged at optically equivalent optical axes (eye points), the photographer can view both the object image and the information image at the same time.

Figure 6A:
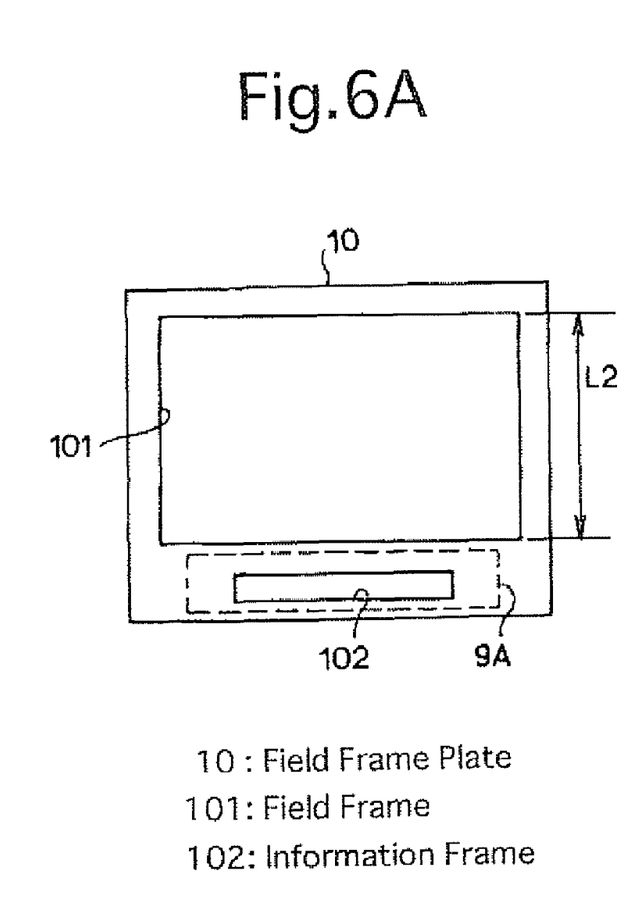
FIG. 6A shows a field frame within a field of view of a finder of the prior art.

As shown in FIG. 6A, a field frame 101 in which the object image is indicated and a laterally elongated information frame 102 located below the field frame 101 are defined by a field frame plate 10 in the field of view of the finder. The information image indicated in the indicator 2 is indicated in the information frame 102. Note that the field frame 101 is arranged with the lower edge being located away from the indication prism 9A, so that the field frame 101 receives no light transmitted through the indication prism 9A.

As shown in FIG. 7, in a known camera, the indicator 2 has an indication surface extending in the vertical direction (when it is assumed that the optical axis of the photographing lens extends in the horizontal direction) and inclined at an angle $\theta i2$ with respect to the incident surface of the pentagonal mirror 7. The angle $\theta i2$ is 90° in FIG. 7. Therefore, in the ocular optical system 8, if the information image is made incident upon the incident surface of the pentagonal mirror 7 at a desired incident angle to thereby converge the information image and the object image onto the same image forming position on the optical axis, the optical axis of the indication prism 9A must bend the optical axis of the information image by an angle $\theta t2$. Accordingly, the angle of the reflecting surface of the indication prism 9A must be set to $\theta t2/2$ with respect to the emitting surface. Since, the deflection angle $\theta t2$ is approximately 90°, the angle $\theta 2$ defined between the reflecting surface and emitting surface, of the indication prism 9A is approximately 45°. Consequently, the length of the emitting surface of the indication prism 9A in the horizontal direction is increased, thus resulting in an increase in the length of the incident surface of the pentagonal mirror 7 extending toward the center portion (in the left direction in FIG. 7). As can be seen in FIG. 6A, since the field frame 101 in the field of view must be arranged in a position so as not to interfere with the indication prism 9A, the length L2 of the field frame 101 in the height direction within the field of view is limited, whereby the finder coverage (ratio between the field surface area of the object image and the entire field of the finder) is reduced.

As shown in FIG. 7, a shutter 3, provided behind the indicator 2, is provided, on the front upper surface portion which faces the indicator 2, with a recess 34A having a rectangular shape in cross section so that the shutter 3 does not interfere with the indicator 2. Likewise, the pentagonal mirror 7 provided in front of the indicator 2 is provided, on the rear and lower surface portion thereof, with a recess 73A having a rectangular shape in cross section. Hence, the shutter 3 is thin at the portion at which the recess 34A is formed and the pentagonal mirror 7 is thin at the portion at which the recess 73A is formed. Consequently, the mechanical strength of the shutter 3 and the pentagonal mirror 7 is reduced, thus resulting in a reduced reliability thereof. In particular, since the pentagonal mirror 7 is made of a resin mold, the reduction in thickness due to the presence of the recess 73A tends to cause the pentagonal mirror 7 to deform. Such deformation causes distortion of the object image in the field of view. Moreover, in order to provide the shutter 3 without having the recess 34A, if the shutter 3 is displaced rearward, the size of the camera in the forward/rearward direction is increased. In particular, in a digital single lens reflex camera, since a low-pass filter must be provided behind the shutter 3, the camera size is considerably increased to an unacceptable extent with respect to miniaturization of the camera.

To eliminate the drawback of reduction in the field of view, Japanese Patent Publication No. 2000-221568 has proposed providing a transparent element behind the pentagonal prism so that the information image of the indicator is incident upon the pentagonal prism via the transparent element from the indication prism, whereby no light is emitted from the emitting surface of the indication prism toward the incident surface of the pentagonal prism and thus, the field frame can be made as large as possible to prevent the reduction of the filed of view.

The technology in the above-referenced disclosure is useful for a camera having a pentagonal prism. However, in a camera having a pentagonal mirror, it is difficult to guide the information image from the transparent element to the pentagonal mirror, and therefore, it is very difficult to apply such technology to a camera having a pentagonal mirror. Moreover, the technology disclosed in the above-referenced disclosure is useful to increase the finder coverage, but it is difficult to eliminate reduction in the strength of the shutter or the pentagonal mirror, and difficult to achieve miniaturization of the camera. Furthermore, the transparent element, provided as a separate component behind the pentagonal mirror, increases the number of the components and the number of the assembling procedures. Since the transparent element is provided in the ocular optical system, a design modification of the ocular optical system is necessary.

SUMMARY OF THE INVENTION

The present invention provides a viewfinder for a single lens reflex camera in which the reliability of the pentagonal mirror and the shutter can be enhanced, and the finder coverage of the object image within the field of view of the finder can be increased without increasing the size of the camera. According to an aspect of the present invention, a viewfinder for a single lens reflex camera is provided, in which a focused image of an object formed on a ground glass by a photographing lens is transmitted to an ocular optical system through a pentagonal prism or a pentagonal mirror and an information image displayed on an indication surface of an indication block is transmitted to the pentagonal prism or pentagonal mirror, through an indication prism, so that the object image and the information image are indicated in the finder view field of the ocular optical system. The indication surface of the indicator is inclined with respect to a direction perpendicular to an incident surface of the image-erecting optical member toward the incident surface. An angle between the indication surface of the indicator and the incident surface of the image-erecting optical member is smaller than 90°.

It is desirable for the angle between the indication surface of the indicator and the incident surface of the image-erecting optical member to be within the range of 65° to 85°.

It is desirable for the indicator to be provided with at least one attachment member for securing the indicator to a mirror box of the single lens reflex camera, the attachment member being provided with an attaching surface which extends in a direction perpendicular to the incident surface of the image-erecting optical member.

It is desirable for the indication prism to be provided between the indicator and the image-erecting optical member, and to be in the form of a triangular column including an incident surface, a reflecting surface, and an emitting surface, so that the information image of the indicator is incident upon the incident surface of the indication prism, is reflected by the reflecting surface of the indication prism, and is emitted from the emitting surface of the indication prism onto the incident surface of the image-erecting optical member.

It is desirable for the indicator to be provided between the image-erecting optical member and a shutter which is provided with an inclined recess so as not to interfere with the indicator.

It is desirable for the image-erecting optical member to include a resin pentagonal mirror having a reflecting inner surface, the indicator being located between the pentagonal mirror and the shutter, the pentagonal mirror being provided with an inclined recess so as not to interfere with the indicator.

The object image can be picked up by an image pickup device. The image pickup device can be a CCD or a CMOS.

Alternatively, the object image can photographed using a photosensitive film.

According to other aspect of the present invention, a viewfinder for a single lens reflex camera is provided, including an image-erecting optical member; an ocular optical system, to which an object image formed on a focusing screen via a photographing lens is transmitted via the image-erecting optical member; an indication prism; and an indicator, from which an information image displayed on an indication surface thereof is transmitted to the image-erecting optical member via the indication prism so that the object image and the information image are both indicated in a finder field of view of the ocular optical system. The indication surface of the indicator is inclined with respect to a direction perpendicular to an incident surface of the image-erecting optical member toward the incident surface.

The present disclosure relates to subject matter contained in Japanese Patent Application No. 2005-163549 (filed on Jun. 3, 2005) which is expressly incorporated herein by reference in its entirety.

BRIEF DESCRIPTION OF THE DRAWINGS

The present invention will be discussed below in detail with reference to the accompanying drawings, in which.

DETAILED DESCRIPTION OF THE PREFERRED EMBODIMENTS

Figure 1:
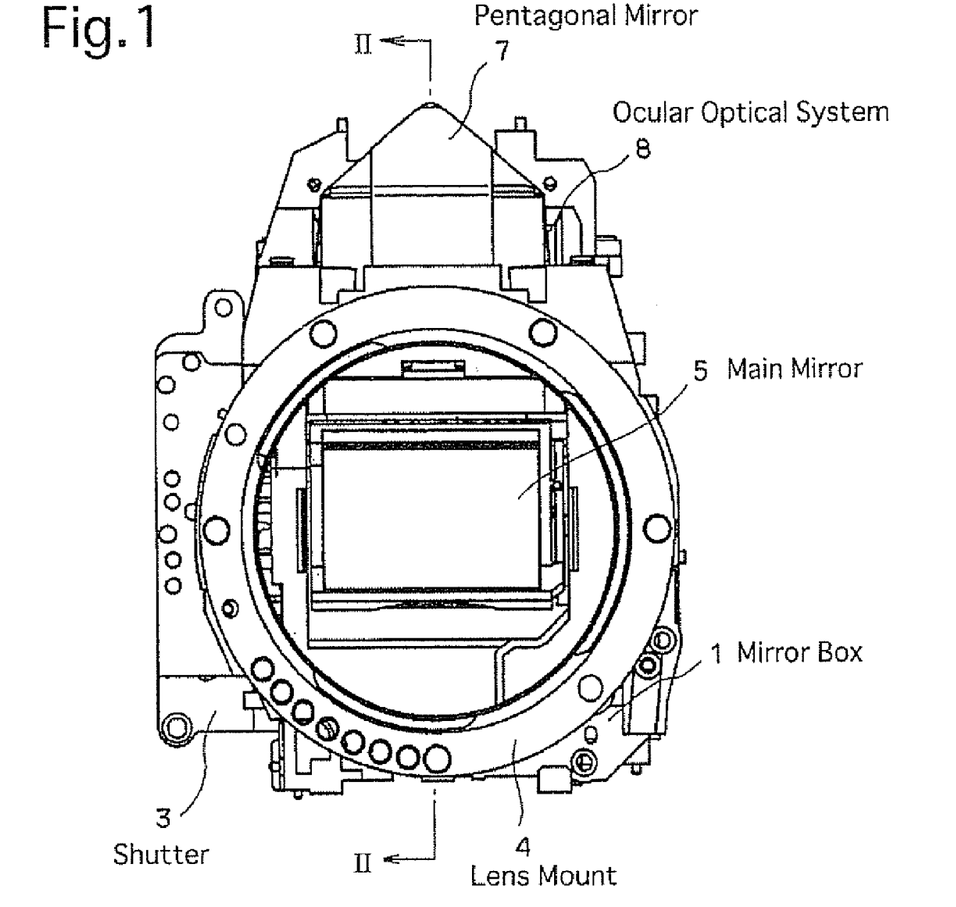
FIG. 1 is a front elevational view of an internal structure of a single lens reflex camera to which the present invention is applied.
Figure 2:
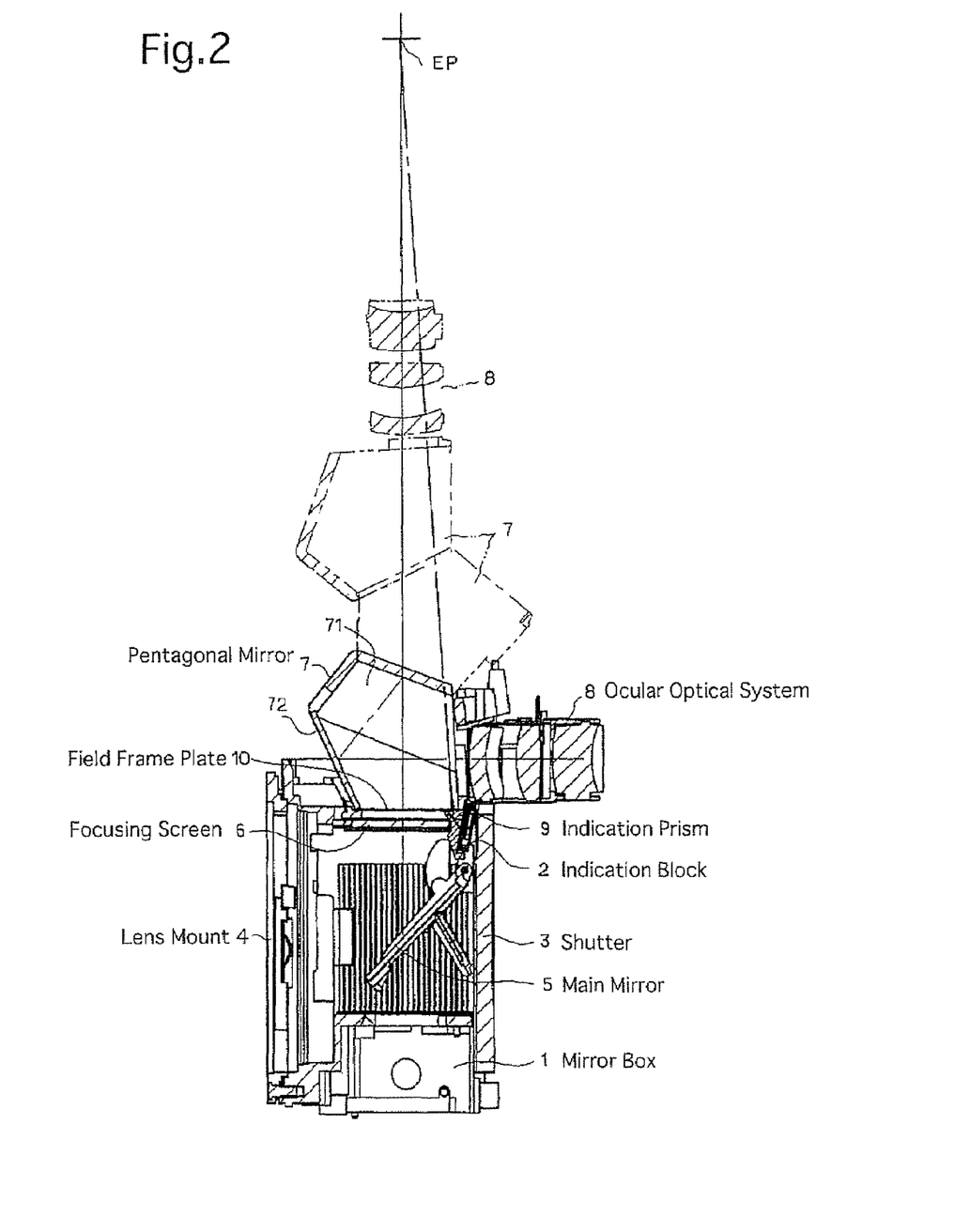
FIG. 2 is a sectional view taken along the line II-II in FIG. 1.
Figure 3:
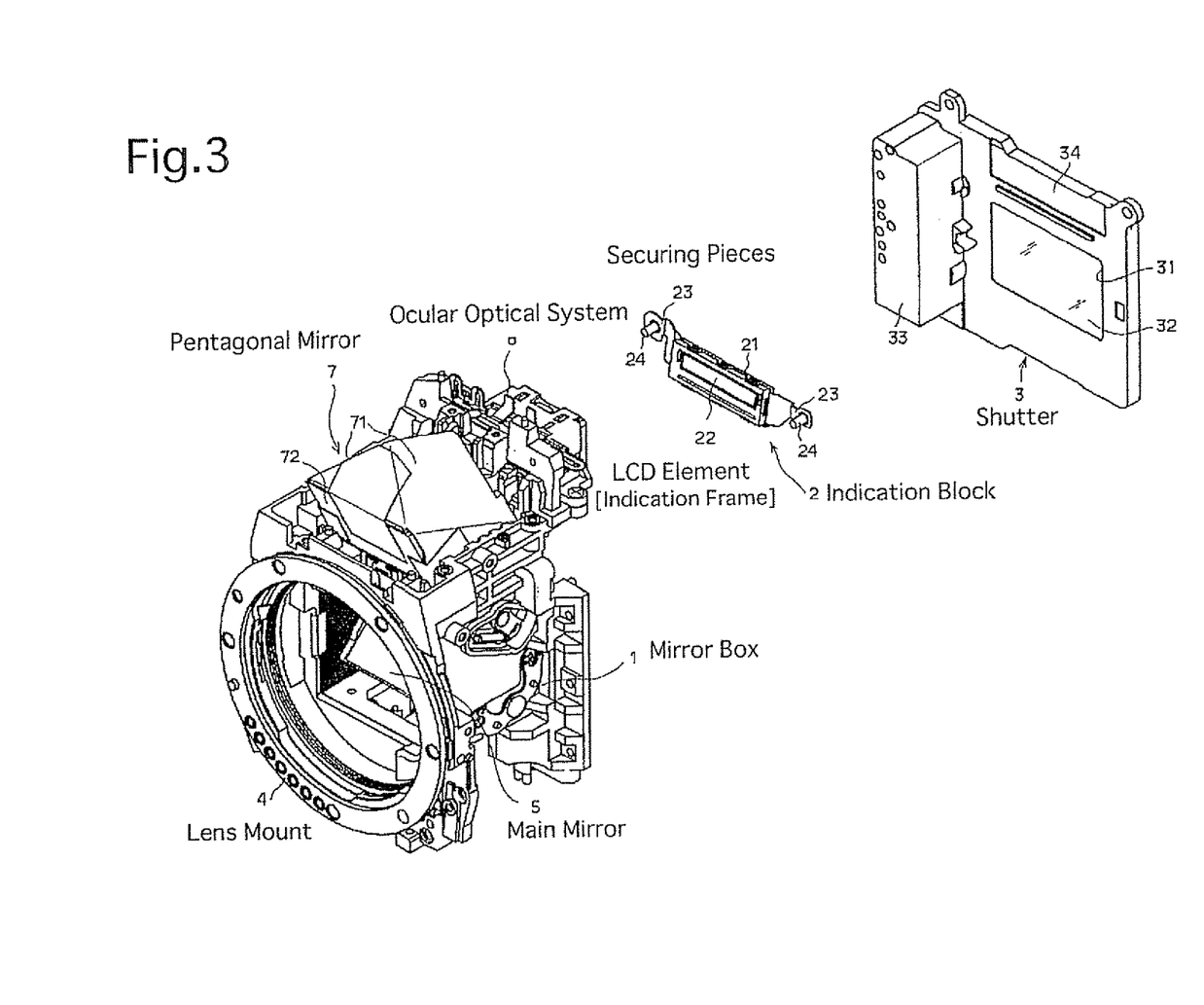
FIG. 3 is an exploded perspective view of a mirror box, an indicator, and a shutter, provided in the camera of the present invention.

Embodiments of the present invention will be discussed below with reference to the accompanying drawings. FIG. 1 shows a front elevational view of a main part of an internal structure of a single lens reflex cameras to which the present invention is applied. FIG. 2 is a sectional view taken along the line A-A in FIG. 1. FIG. 3 is an exploded perspective view of FIG. 1. In this embodiment, the internal structure includes a mirror box 1, an indicator 2, and a shutter 3. The indicator 2 is attached to the rear upper portion of the mirror box 1 and the shutter 3 is integrally attached to the back of the indicator 2. Note that although the illustrated embodiment is applied to a digital single lens reflex camera, the present invention can also be applied to a film single lens reflex camera.

A lens mount 4, a main mirror 5, a focusing screen 6, a pentagonal mirror (image-erecting optical member) 7, and an ocular optical system 8 are provided in the mirror box 1. The lens mount 4 is secured to the front surface of the mirror box 1, so that a photographing lens (not shown) can be attached to the lens mount 4. The main mirror 5 is supported in the mirror box 1 so as to tilt in the upward and downward direction. When the main mirror 5 is tilted upward, the object light transmitted through the photographing lens is converged onto a light receiving surface of an image pickup device such as a CCD or CMOS (not shown) through an aperture 31 of the shutter 3. In the case of a film single lens reflex camera, the object light is converged onto a photosensitive surface of a photosensitive film (not shown). When the main mirror 5 is tilted downward, the object light transmitted through the photographing lens is reflected upward, so that the object image is formed on the focusing screen 6 which is held horizontally on the mirror box 1. The object image formed on the focusing screen 6 enters the pentagonal mirror 7 from the lower incident surface thereof and is reflected successively by the right and left inclined roof surfaces 71 and the front reflecting surfaces 72 to form an erect object image. The pentagonal mirror 7 is made of a resin mold and is provided with an inner surface subjected to a treatment to form a reflecting surface. The pentagonal mirror can be referred to as a roof mirror. The ocular optical system 8 includes a plurality of lenses (not shown) so that the erect object image formed by the pentagonal mirror 7 is magnified and formed at an image forming position on the optical axis corresponding to the diopter of a photographer.

Figure 4:
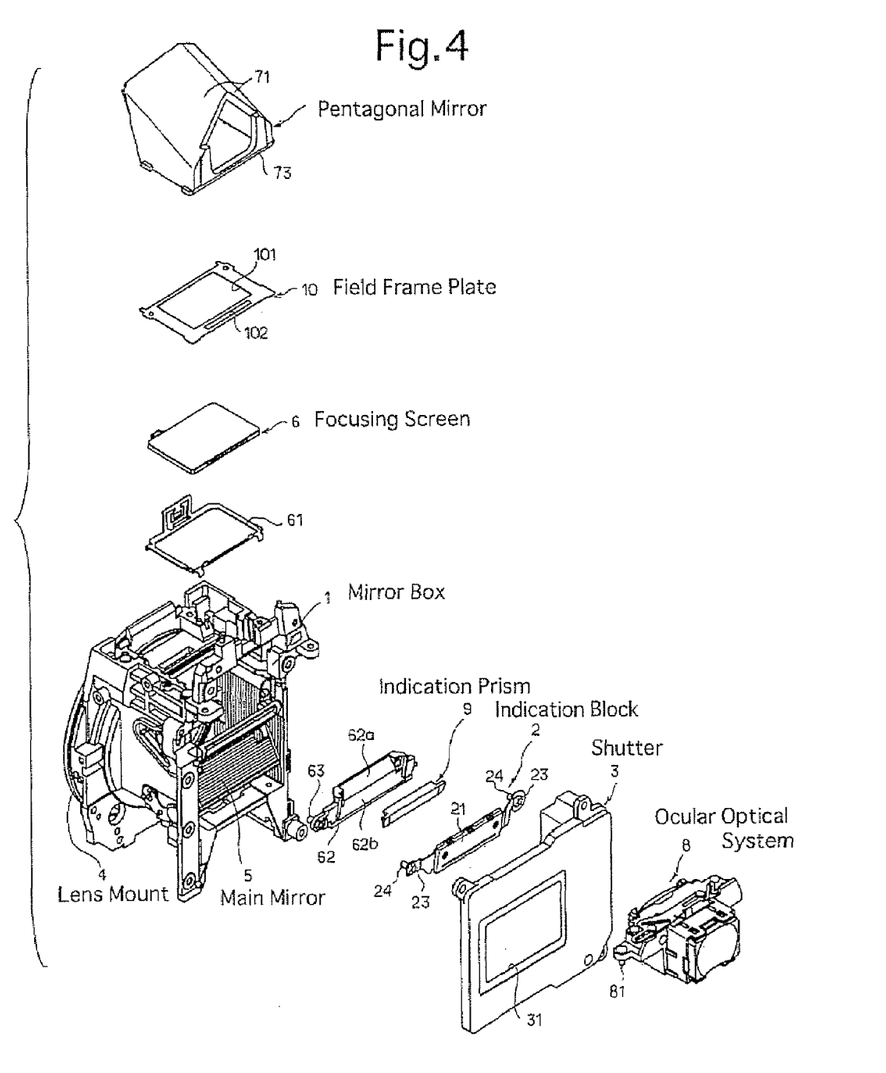
FIG. 4 is a partially exploded perspective view of an internal structure of the camera of the present invention.

FIG. 4 shows a partially exploded perspective view of the internal structure of the camera discussed above. A focusing screen retaining plate 61 is horizontally provided on the upper frame of the mirror box 1 and the focusing screen 6 is placed on the focusing screen retainer 61. A focusing screen retaining holder 62 which integrally supports the indication prism 9 (which will be discussed in detail hereinafter) is secured to the upper portion of a rear frame of the mirror box 1 by a screw 63. Thus, the focusing screen 6 is secured to the upper frame of the mirror box 1 by the focusing screen retainer 61 and the focusing screen retaining holder 62. A field frame plate 10 is placed on the focusing screen 6. The field frame plate 10 includes a field frame 101 for indicating the object image and an elongated information frame 102 located below the field frame 101 (see FIG. 6B) for indicating the information image of the indicator 2. The pentagonal mirror 7 is located on the field frame 10 and is held on the mirror box 1 by a pentagonal mirror protecting frame (not shown), etc.

Figure 5:
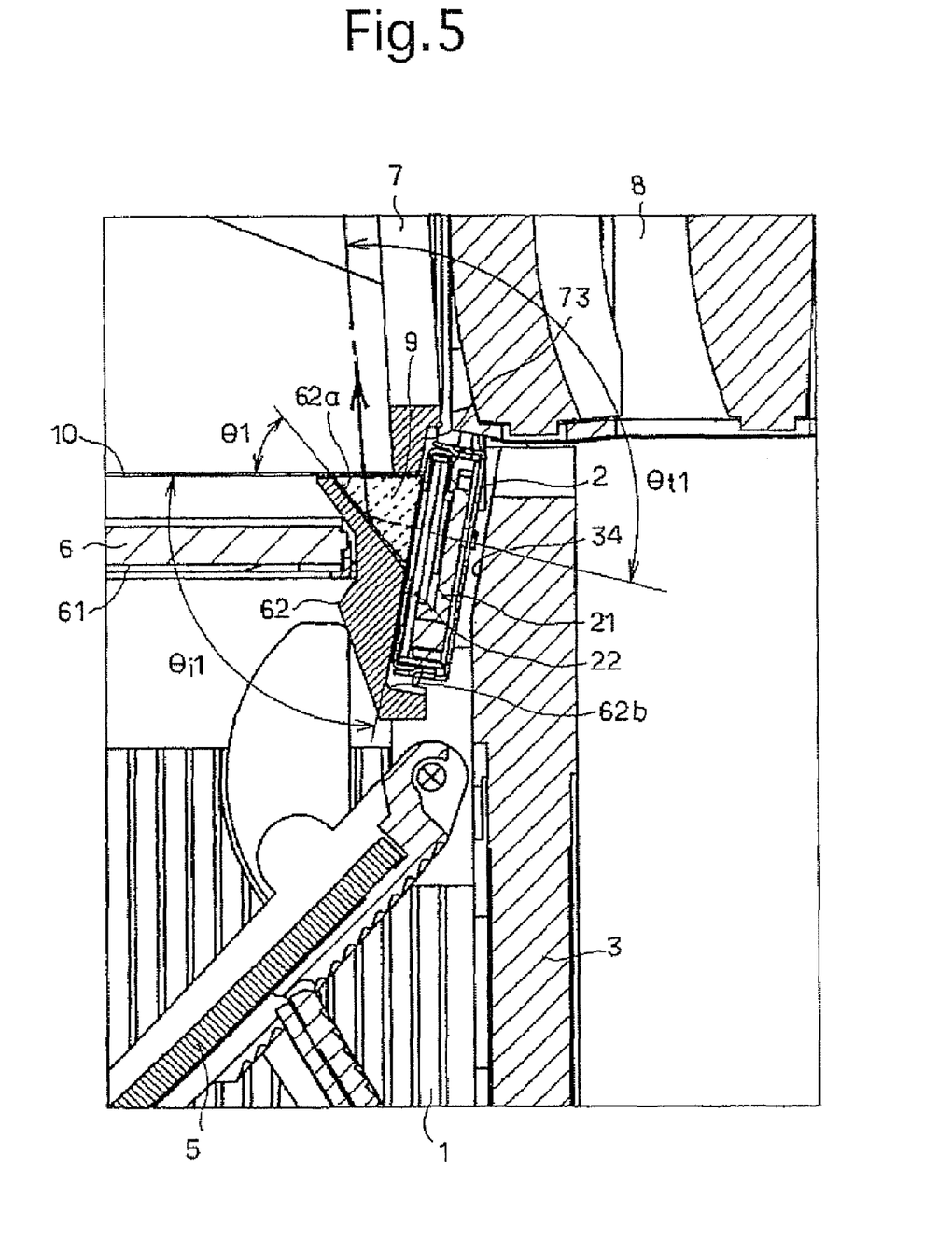
FIG. 5 is an enlarged sectional view of an internal structure of the camera of the present invention.

FIG. 5 shows an enlarged view showing details of the indicator 2, the shutter 3, the indication prism 9, etc. The indicator 2 is secured to the rear surface frame of the mirror box 1 located behind the focusing screen retaining holder 62 and faces the indication prism 9. The indicator 2 is provided with an elongated casing 21 which holds therein an LCD (liquid crystal display) element 22 (see FIG. 3). The LCD element 22 is controlled by a control circuit (not shown) and generates an information image represented by letters or symbols, etc. The information image is indicated on a front surface (indication surface) of the LCD element 22. As can be seen in FIGS. 3 and 4, the casing 21 of the indicator 2 includes securing projections (attachment members) 23 projecting at opposite ends thereof. The casing 21 of the indicator 2 is secured to the mirror box 1 by securing the securing projections 23 to the mirror box 1 by screws 24. The securing projections 23 are defined by vertical surfaces corresponding to the rear surface frame of the mirror box 1 which extends vertically. As can be seen in FIG. 5, the front surface of the LCD element 22, i.e., the indication surface, is inclined slightly in the upward direction. The inclination angle is in the range of 5° to 25° with respect to the rear surface frame and is 10° in the illustrated embodiment.

As shown in FIG. 3, the shutter 3, provided behind the indicator 2, is secured to the rear surface frame of the mirror box 1 by screws (not shown). The shutter 3 is made of a flat plate having an aperture 31 in which shutter blades 32 are provided. The shutter blades 32 are moved by a drive mechanism 33 provided at one side of the shutter 3 to open and close the aperture 31.

The ocular optical system 8 having a plurality of lenses is secured to the rear surface of the upper frame of the mirror box 1 by screws 81, as shown in FIG. 4. The ocular optical system 8 enables a photographer to view the magnified object image formed on the focusing screen 6 and the magnified information image of the indicator 2 within the same visual field of the viewfinder.

As can be seen in FIG. 5, a prism receiving portion 62a which is inclined in the forward direction of the camera is formed at the upper portion of the rear surface of the focusing screen retaining holder 62. The indication prism 9 is received in the prism receiving portion 62a. The indication prism 9 is in the form of a laterally extending column having a triangular cross section and has an incident surface facing rearwards, an emitting surface, facing upward and a reflecting surface in close contact with the prism receiving portion 62a. The rear surface 62b of the focusing screen retaining holder 62 is inclined downwardly and rearwardly so as to be flush with the incident surface of the indication prism 9. When the indicator 2 is obliquely attached to the rear surface frame of the mirror box 1 by the opposite securing projections 23, the indication surface of the indicator 2 is in contact with the inclined rear surface 62b of the focusing screen retaining holder 62. In this state, the indication surface of the indicator 2 which is opposed to the incident surface of the indication prism 9 is inclined toward the incident surface side of the pentagonal mirror 7 with respect to a direction perpendicular to the incident surface of the pentagonal mirror 7, so that the angle $\theta i1$ between the indication surface of the indicator 2 and the incident surface of the pentagonal mirror 7 is smaller than 90° and is in the range of 65° to 85°. In the illustrated embodiment, as the inclination angle of the indication surface of the indicator 2 is 10°, the angle $\theta i1$ is 80°.

The upper portion of the inclined indicator 2 faces the lower portion of the rear surface of the pentagonal mirror 7. To prevent interference between the indicator 2 and the pentagonal mirror 7, a inclined recess 73 extending along the inclined surface of the indicator 2 is formed at the lower portion of the rear surface of the pentagonal mirror 7. Likewise, to prevent interference between the upper portion of the front surface of the shutter 3 and the indicator 2 facing thereto, an inclined recess 34 extending along the inclined surface of the indicator 2 is formed at the upper portion of the front surface of the shutter 3.

In the single lens reflex camera having the internal structure as mentioned above, when the main mirror 5 is in the downwardly tilted position, the object light transmitted through the photographing lens is reflected upward by the main mirror 5 and is converged onto the focusing screen 6 to form an object image. The object image formed on the focusing screen 6 is incident upon the lower incident surface of the pentagonal mirror 7 through the substrate frame 101 of the filed frame 10 and is inverted into an erect object image by internal reflections in the pentagonal mirror 7, and is focused on the optical axis at the image forming position corresponding to the diopter of the photographer. At the same time, the information image indicated on the indication surface of the indicator 2 is incident upon the incident surface of the indication prism 9 and is reflected by the reflecting surface thereof and is emitted from the emitting surface thereof. Thereafter, the information image is incident upon the incident surface of the pentagonal mirror 7 through the information image frame 102 of the field frame 10, is inverted into an erect image as in the object image, and enters the ocular optical system 8. The optical path length from the indication surface of the indicator 2 to the incident surface of the pentagonal mirror 7, i.e., the optical path length of the information image from the incident surface of the indication prism 9 to the emitting surface thereof is shortened to 1/n due to the refractive index n of the indication prism 9, and hence, the axial position of the indication surface of the indicator 2 is optically equivalent to the focusing screen 6. Therefore, the object image and the information image are formed at the same position EP (eye point) on the optical axis through the ocular optical system 8, as indicated by a phantom line in FIG. 2. Thus, the photographer can view the object image and the information image in the object image frame 101 and information image frame 102, of the field frame 10 within the field of view, at the same diopter.

Figure 6B:
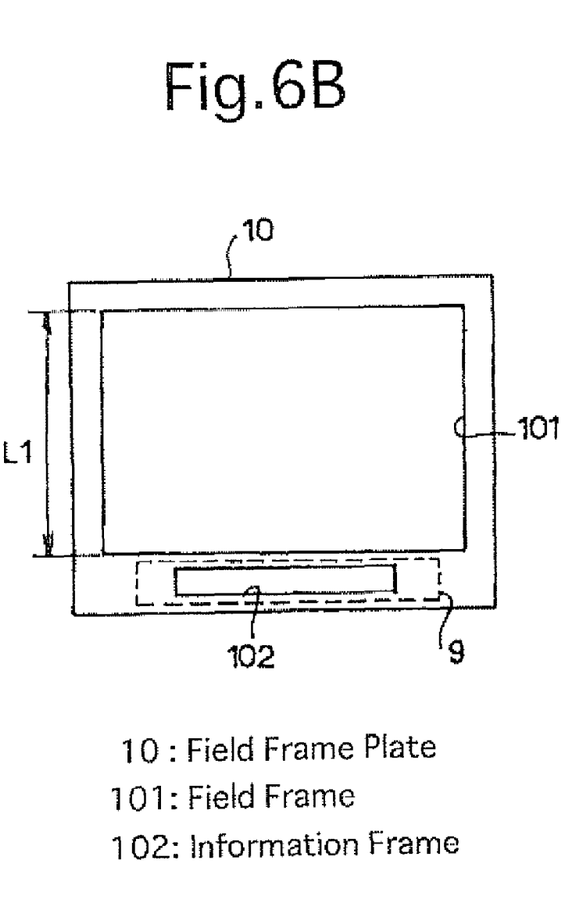
FIG. 6B shows a field frames within a field of view of a finder of the present invention.

The indication surface of the indicator 2 is inclined inwardly with respect to a direction perpendicular to the incident surface of the pentagonal mirror 7, and the angle between the indication surface and the incident surface of the pentagonal mirror 7 is set to 80°, smaller than a right angle. Therefore, the deflection angle $\theta t1$ by which the direction of the information image of the indicator 2 is deflected by the indication prism 9 with respect to the incident surface of the pentagonal mirror 7, i.e., the deflection angle of the light rays (optical axis) of the information image in order to converge the information image onto the eye point on the same axis as the object image is larger than the deflection angle $\theta t2$ (FIG. 7) of the prior art. Consequently, the angle $\theta 1$ between the emitting surface and the reflecting surface of the indication prism 9 can be made larger than the corresponding angle $\theta 2$ (FIG. 7) in the prior art. Thus, the length (in the forward direction) of the emitting surface of the indication prism 9 toward the center of the optical axis of the pentagonal mirror 7 can be reduced. As a result, the length of the indication prism 9 extending toward the center (left direction in FIG. 5) of the incident surface of the pentagonal mirror 7 can be reduced, within the field of view of the finder, as shown in FIG. 6B and, hence, the position of the lower edge of the object image frame 101 of the field frame 10 in the height direction can be displaced in the downward direction. Consequently, the height L1 of the object image frame 101 can be made larger than the height L2 of the prior art, thus resulting in an increased size of the field of view of the viewfinder.

The mounting position of the indicator 2 onto the mirror box 1 via the securing projections 23 is adjusted in the upward and downward direction to adjust the position of the indication surface with respect to the incident surface of the indication prism 9 in the directions perpendicular to, and parallel with the incident surface, while maintaining the inclination angle of the indication surface. This positional adjustment makes it possible to achieve a fine focus adjustment of the information image and a positional adjustment of the information image within the information image frame 102 of the field frame 10 in the upward and downward direction.

Furthermore, since the lower portion of the indicator 2 is displaced forward due to an inclination of the indicator 2, as mentioned above, the recess 34 formed on the upper portion of the front surface of the shutter 3 can be inclined. Therefore, it is not necessary to form a rectangular recess having a size substantially the same as the height of the indicator 2 to prevent interference of the shutter 3 with the indicator 2, as in the prior art. Consequently, no reduction in the thickness of the upper portion of the shutter 3 occurs. As a result, it is possible to prevent the mechanical strength of the shutter 3 from being reduced. At the same time, due to the inclination of the indicator 2, it is not necessary to displace the upper portion of the indicator 2 forward, and in some cases, the upper portion of the indicator 2 can also be displaced further rearward than that in the prior art, accordingly, the recess 73 formed on the lower portion of the rear surface of the pentagonal mirror 7 can be inclined so as to prevent the thickness of the lower portion of the rear surface from being reduced, in comparison with the prior art in which the rectangular recess is formed, and thus the mechanical strength of the pentagonal mirror 7 can be ensured. In addition, it is not necessary to displace the shutter 3 rearwardly, thus allowing miniaturization of the camera. Moreover, the absence of the transparent element as disclosed in Japanese Patent Publication No. 2000-221568 also contributes to miniaturization of the camera.

Although the angle between the indication surface of the indication prism 2 and the incident surface of the pentagonal mirror 7 is 80° in the illustrated embodiment, the angle can be set to be a desired value within the range of 65° to 85°. If the angle between the indication surface of the indication prism 2 and the incident surface of the pentagonal mirror 7 is small (within the range of 65° to 85°), the deflection angle by the indication prism 9 can be increased to reduce the size of the reflecting surface thereof to thereby increase the finder coverage of the object image within the field of view of the viewfinder. If the angle between the indication surface of the indication prism 2 and the incident surface of the pentagonal mirror 7 is large (within the range of 65° to 85°), the finder coverage of the object image is increased decreased and the size of the indicator in the forward/rearward direction can be reduced, whereby the size of the camera in the forward/rearward direction can be advantageously reduced. Hence the angle between the indication surface of the indication prism 2 and the incident surface of the pentagonal mirror 7 can be determined in accordance with the requirements of the camera.

Although the present invention is applied to a digital single lens reflex camera, in the illustrated embodiment, the present invention can also be applied to a single lens reflex camera using a photosensitive film, i.e., a silver-halide film. Moreover, the present invention can be applied to a single lens reflex camera in which a pentagonal prism is used in stead of a pentagonal mirror.

According to the present invention, since the indication surface of the indicator 2 is inclined by an angle smaller than 90°, with respect to a direction perpendicular to the incident surface of the pentagonal mirror 7 toward the incident surface side, the deflection angle of the information image of the indicator 2 with respect to the incident surface of the pentagonal mirror 7, caused by the indication prism 9 is increased, so that the angle of the reflecting surface of the indication prism can be increased. Consequently, the length of the emitting surface of the indication prism projecting in the axial direction of the pentagonal mirror 7 can be reduced. As a result, the field frame 101 within the field of view of the finder can be increased, thus resulting in an increase in the finder coverage.

Since the indication surface of the indicator is inclined, the recesses provided in the front and upper portion of the shutter and the rear and lower portion of the pentagonal mirror 7 can be inclined, so that it is possible to prevent the thickness of the corner portions from being reduced to provide the sufficient mechanical strength of the shutter or the pentagonal mirror 7, in order to enhance the reliability thereof. Furthermore, it is not necessary to displace the position of the indicator or the shutter in the rearward direction of the camera. Consequently, no increase in the size of the camera in the forward/rearward direction takes place, thus leading to a miniaturization of the camera.

Obvious changes may be made in the specific embodiments of the present invention described herein, such modifications being within the spirit and scope of the invention claimed. It is indicated that all matter contained herein is illustrative and does not limit the scope of the present invention.

The invention claimed is:

1. A viewfinder for a single lens reflex camera, in which a focused image of an object formed on a ground glass by a photographing lens is transmitted to an ocular optical system through an image-erecting optical member, and an information image displayed on an indication surface of an indication block is transmitted to the said image-erecting optical member, through an indication prism, so that the object image and the information image are indicated in the finder view field of the ocular optical system,
    wherein the indication surface of the indication block is inclined with respect to an optical axis of said ocular optical system, lies along a plane that intersects the optical axis of said ocular optical system, and faces said image-erecting optical member.

2. The viewfinder for an single lens reflex camera according to claim 1, wherein said indication block is provided with at least one attachment member for securing said indication block to a mirror box of said single lens reflex camera, said attachment member being provided with an attaching surface which extends in a direction perpendicular to said optical axis of said ocular optical system.

3. The viewfinder for an single lens reflex camera according to claim 1, wherein said indication prism is provided between said indication block and said image-erecting optical member, and is in the form of a triangular column including an incident surface, a reflecting surface, and an emitting surface, so that said information image of said indication block is incident upon said incident surface of said indication prism, is reflected by said reflecting surface of said indication prism and is emitted from said emitting surface of said indication prism toward said image-erecting optical member.

4. The view finder for an single lens reflex camera according to claim 1, wherein said indication block is provided between said image-erecting optical meter and a shutter which is provided with a inclined recess so as not to interfere with said indication block.

5. The viewfinder for a single lens reflex camera according to claim 1, wherein said image-erecting optical member comprises a resin pentagonal mirror having an reflecting inner surface, said indication block being located between the pentagonal mirror and said shutter, said pentagonal mirror being provided with an inclined recess so as not to interfere with said indication block.

6. The viewfinder for a single lens reflex camera according to claim 1, wherein said object image is picked up by an image pickup device.

7. The viewfinder for a single lens reflex camera according to claim 6, wherein said image pickup device comprises one of a CCD and a CMOS.

8. The viewfinder for a single lens reflex camera according to claim 1, wherein said object image is photographed using a photosensitive film.

9. The viewfinder for a single lens reflex camera according to claim 1, wherein an angle between said indication surface of said indicator and said optical axis of said ocular optical system is smaller than 90°.

10. The viewfinder for an single lens reflex camera according to claim 9, wherein said angle between said indication surface and optical axis of said ocular optical system is within the range of 65° to 85°.

11. A viewfinder for a single lens reflex camera, comprising:
    an image-erecting optical member;
    an ocular optical system, to which an object image formed on a focusing screen via a photographing lens is transmitted via said image-erecting optical member;
    an indication prism; and
    an indicator, from which an information image displayed on an indication surface thereof is transmitted to said image-erecting optical member via said indication prism so that said object image and said information image are both indicated in a finder field of view of said ocular optical system,
    wherein said indication surface of the indicator is inclined with respect to an optical axis of said ocular optical system, lies along a plane that intersects the optical axis of said ocular optical system, and faces said image-erecting optical member, and
    wherein an angle between said indication surface of said indicator and said optical axis of said ocular optical system is smaller than 90°.

12. The viewfinder for an single lens reflex camera according to claim 11, wherein said angle between said indication surface of said indicator and optical axis of said ocular optical system is within the range of approximately 65° to approximately 85°.

13. A viewfinder for a single lens reflex camera, in which a focused image of an object formed by a photographing lens is transmitted to an ocular optical system through an image-erecting optical member, and in which an information image displayed on an indication surface of an indicator is transmitted to said image-erecting optical member through an indication prism such that the object image and the information image are indicated in the finder view field of the ocular optical system, wherein the indication surface of the indicator faces the image-erecting optical member, lies along a plane that intersects an optical axis of said ocular optical system, and is inclined with respect to an image-forming plane of the single lens reflex camera.

14. The viewfinder for an single reflex camera according to claim 13, wherein an angle between said indication surface of said indicator and the image-forming plane is within the range of approximately 5° to approximately 25°.

* * * * *